H. C. ODEN.
CLAW STRUCTURE FOR MILKING MACHINES.
APPLICATION FILED AUG. 27, 1919.
1,385,577.
Patented July 26, 1921.
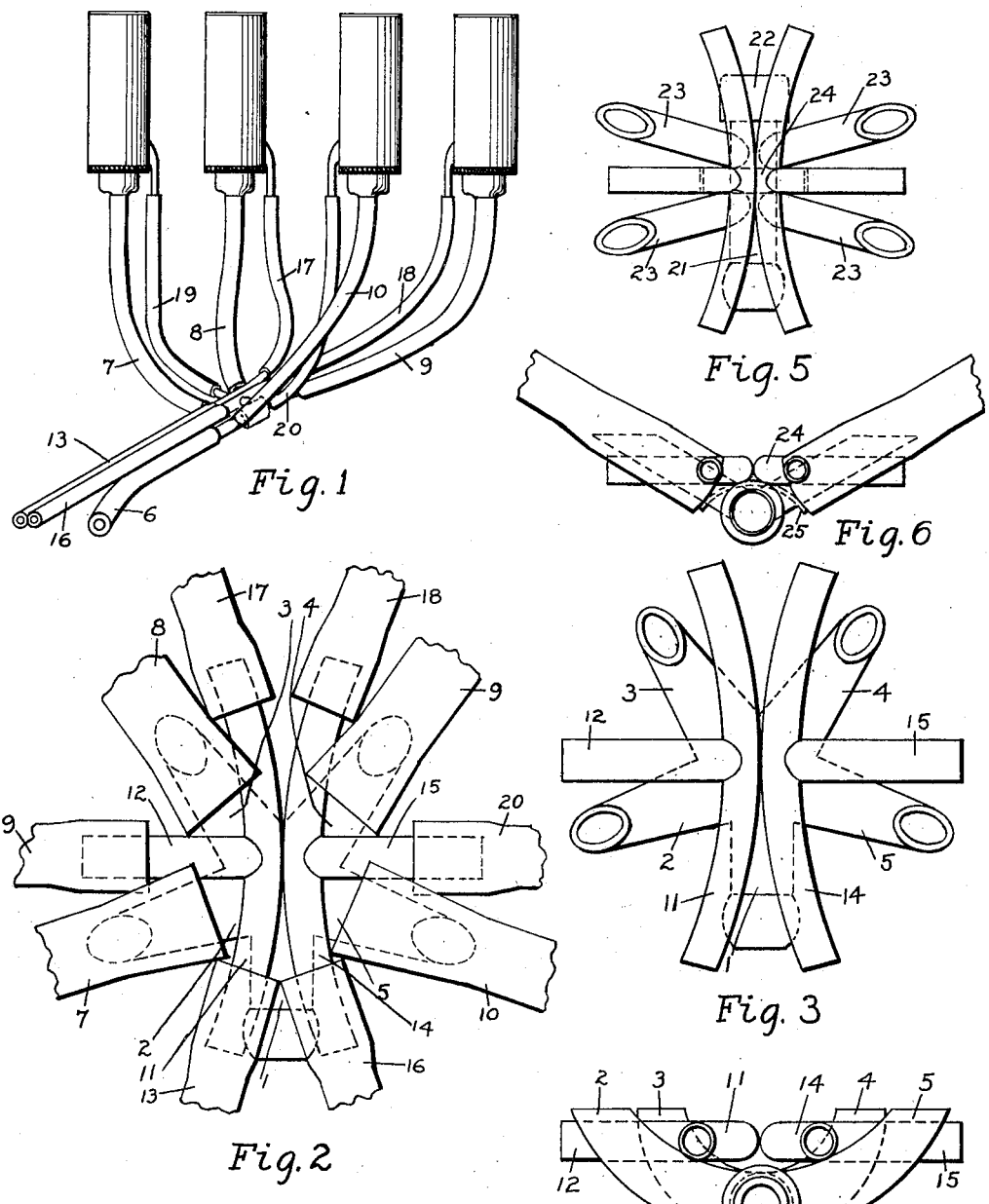

UNITED STATES PATENT OFFICE.

HENRY CLYDE ODEN, OF COLUMBUS, OHIO, ASSIGNOR TO NU-WAY MILKER COMPANY, INC., OF SYRACUSE, NEW YORK, A CORPORATION OF NEW YORK.

CLAW STRUCTURE FOR MILKING-MACHINES.

1,385,577.  Specification of Letters Patent.  Patented July 26, 1921.

Application filed August 27, 1919. Serial No. 320,098.

*To all whom it may concern:*

Be it known that I, HENRY CLYDE ODEN, a citizen of the United States of America, residing at Columbus, in the county of Franklin and State of Ohio, have invented certain new and useful Improvements in Claw Structures for Milking-Machines, of which the following is a specification.

My invention relates to claw structure for milking machines and is directed toward the provision of a device of this nature that will lend itself readily to cleansing and separation of parts. It contemplates such a structure that the various conduits used in a claw construction may be readily subjected to brushing and that there will be no inaccessible crevices or corners. Furthermore, it aims to provide such a claw structure that the milk claw is entirely independent of the air claw, so that the destruction of one will not necessitate discarding of the other.

My milk claw is of peculiarly advantageous form in that the conduits which lead to the teat cups converge toward each other as they approach their points of juncture with the main conduits. Furthermore, they are so shaped in conjunction with such main conduit that there is produced a concavo-convex unit that is of unusually small area, the small area being largely due to the convergence of the conduits.

My air claw is modeled to carry out the idea of the concavo-convex unit when joined to the milk claw being itself of concavo-convex form. In its preferred form, it is so constructed that, when placed in operative relation to the other parts of the milking machine, it may be held in contact with the milk claw by these other parts. This, I may accomplish by the inherent structure of the milk claw and the air claw, or I may provide the air claw with fingers that are especially designed to maintain this interlocking relation.

An important feature of my invention resides in the fact that I utilize two claws which are not connected together and are merely held in juxtaposed relation by the surrounding structure of the milking machine. By this construction, I attain a very important result, in that the air claw may be entirely removed from proximity to the milk claw by merely removing one of the tubes which is connected to the milk claw. Thus, in the operation of brushing the milk claw and tubes which is resorted to daily in some dairies, my air claw may be entirely removed from the milk claw without disconnecting the air tubes from either the pulsator or the air claw.

The preferred embodiment of my invention is shown in the accompanying drawings wherein similar characters of reference designate corresponding parts and wherein—

Figure 1 is a perspective view of my claw structure in operative position and connected to the teat cups.

Fig. 2 is a plan view of my milk claw and air claw locked together by the milk tubes and the air tubes.

Fig. 3 is a plan view of my air claw superimposed upon my milk claw with the tubes removed.

Fig. 4 is an end elevation of the structure shown in Fig. 3.

Fig. 5 is a plan view of a modified form of claw construction.

Fig. 6 is an end elevation of the structure shown in Fig. 5, with the milk tubes applied thereto.

In the drawings and with particular reference to Figs. 1 to 4, inclusive, my claw construction is shown as comprising a milk claw having a main conduit 1, and supplemental conduits 2, 3, 4 and 5. This main conduit is connected through the spigot valve to the interior of the pail and a source of vacuum by a flexible tube 6. The supplemental conduits are connected to the inner chambers of the teat cups by flexible tubes 7, 8, 9 and 10.

By inspection of Fig. 4 it will be apparent that the conduits 2, 3, 4 and 5 are curved upwardly as they leave the main conduit 1 and this produces a concavo-convex construction whose base may be readily gripped by the hand and whose top affords a concave seat for the air claw which is desirably mounted therein during operation of the milking machine.

The air claw is an entirely separate member comprised of the conduit 11 with its connection 12 which conduit is connected alternately to vacuum and to atmosphere by a flexible tube 13 and a conduit 14 with its connection 15 which conduit is connected alternately to vacuum and to atmosphere by a flexible tube 16. It will be understood that these two conduits are independent in the sense that they do not communicate and while one is filled with atmospheric air the other is being subjected to vacuum. These conduits are curved away from each other at both ends. Thus, these ends may readily receive the tubes 13, 16, 17 and 18 which are to be applied thereto and the number of right angled conduits is reduced to a minimum. These right-angled conduits are connected to tubes 19 and 20.

The curving of these ends brings the tubes of the milk claw and air claw into such a binding relation that the claws cannot be separated without removing one of the tubes. This, in itself, is a very important feature for the reasons already pointed out anent the cleansing of the milk claw and tubes by brushing.

A modification of my claw construction is shown in Figs. 5 and 6 wherein the milk claw is formed with a straight tube 21 threaded at one end for the reception of a removable cap 22 and provided at the other end with a nipple for the reception of the main suction tube. Supplementing this straight tube 21, I have provided a plurality of upwardly inclined divergent conduit members 23 to which the tubes leading to the inner chambers of the teat cups are to be connected.

These conduits 23 together with the tube 21 form a cradle for the air claw 24 that is of a form similar to the air claw shown in the other figures except that it is provided with downwardly depending fingers 25 that straddle the tube 21 and are locked in such position by the tubes placed on the milk claw, so that one of such tubes must be removed before the air claw can be removed therefrom.

From this description, it will be apparent that I have provided a claw construction that lends itself readily to the handling necessary in everyday work, that is readily separable into two parts in a way highly desirable for the cleaning operations daily resorted to in a modern dairy. More explicitly, it will be seen that my air claw may be separated from milk claw merely by removing one tube from the milk claw and without removing any tubes from the air claw. Furthermore, it will be obvious that my claw members are of such an inherent structure that they lend themselves readily to cleansing and can be made at a minimum cost.

Having thus described my invention, what I claim is:

1. In milking machine construction, a milk claw and an air claw designed to contact with each other without connection and so constructed that they will be held together when placed in position for operation by the complemental parts of the milking machine.

2. In milking machine construction, a milk claw and an air claw designed to rest one upon the other without connection, said claws being so constructed that the rubber tubes attached to one serve to hold both together.

3. In milking machine construction, a milk claw and an air claw independent of each other, said claws being so constructed that the rubber tubes applied to one will hold them together while the removal of one rubber tube will permit separation.

4. In milking machine construction, a milk claw, an air claw independent of said milk claw, and fingers on one of said claws which contact with the tubes attached to the other claw in a manner to hold both claws together.

5. In milking machine construction, a milk claw, an air claw for contacting with said milk claw without connection thereto, and fingers on said air claw which coact with the tubes applied to said milk claw to hold both claws together.

6. In milking machine construction, a milk claw comprising a main conduit and a plurality of converging conduits connected to said main conduit.

7. In milking machine construction, a milk claw comprising five conduits which are joined together in one plane and radiate substantially from a common center.

8. In milking machine construction, a milk claw consisting of five conduits of equal length.

9. In milking machine construction, a milk claw comprising a plurality of conduits, said conduits being so arranged no two of them are at right angles with each other.

10. In milking machine construction, a milk claw of concavo-convex star-like form.

11. A star-shaped milk claw for milking machines.

12. In milking machine construction, an air claw and a milk claw independent of each other but having their conduits so disposed that the tubes of the milking machine when placed thereon effect an interlocking action that holds said claws together.

13. In milking machine construction, a milk claw, an air claw independent thereof but comprising conduits which are curved into such relation to the conduits of the milk claw that the placing of the tubes of the milking machine in operative position will lock said air and milk claws together.

14. In milking machine construction, an air claw comprising curved conduits.

In testimony whereof I hereby affix my signature.

HENRY CLYDE ODEN.